(12) United States Patent
Wang et al.

(10) Patent No.: US 7,199,947 B2
(45) Date of Patent: Apr. 3, 2007

(54) MINIATURE DIGITAL CAMERA LENS

(75) Inventors: Dongxue Wang, Lake Zurich, IL (US); Kevin W. Johnson, Mundelein, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 11/023,821

(22) Filed: Dec. 28, 2004

(65) Prior Publication Data

US 2006/0139770 A1    Jun. 29, 2006

(51) Int. Cl.
  *G02B 9/00* (2006.01)
  *G02B 9/64* (2006.01)
(52) U.S. Cl. ..................... 359/754; 359/755
(58) Field of Classification Search ........ 359/754–756, 359/793–794
  See application file for complete search history.

(56) References Cited

U.S. PATENT DOCUMENTS

| | | | |
|---|---|---|---|
| 1,792,917 A | 2/1931 | Merle | |
| 2,117,252 A | 5/1938 | Lee | |
| 3,504,961 A * | 4/1970 | Hoogland et al. | 359/754 |
| 3,924,934 A | 12/1975 | Grey | |
| 4,304,466 A | 12/1981 | Betensky | |
| 5,796,528 A * | 8/1998 | Mihara | 359/753 |
| 5,798,874 A * | 8/1998 | Yamamoto | 359/761 |
| 2003/0161054 A1 | 8/2003 | Sato | |
| 2004/0042087 A1* | 3/2004 | Takato | 359/694 |

* cited by examiner

*Primary Examiner*—Jordan M. Schwartz
(74) *Attorney, Agent, or Firm*—Philip A. Premysler; Sylvia Chen

(57) ABSTRACT

Miniature camera lenses (100, 300) include in order an object side (116, 302) to the image side (118, 304) a first double concave lens (102, 306), a lens group including first convergent meniscus lens (104, 318), a first double convex lens (106, 312), a second convergent meniscus lens (108, 318), a second double concave lens (110, 330), a second double convex lens (112, 336), and a divergent meniscus lens (114, 342). The lenses (100, 300) feature a field of view of about fifty six degrees, low distortion, a relatively long back focal distance, and a relatively low F-number.

19 Claims, 4 Drawing Sheets

MINIATURE DIGITAL CAMERA LENS

FIELD OF THE INVENTION

The present invention relates to digital camera lenses.

BACKGROUND OF THE INVENTION

The last decade has witnessed the transformation of personal communication brought about by the widespread adaptation of handheld wireless communication technology. The roadmap for future development of wireless communications points to increased bandwidth. Increased bandwidth affords the opportunity to exchange high bandwidth data such as still images and video. Recently, handheld wireless communication devices (e.g., cellular telephones) that have built-in digital cameras have been introduced. Such devices allow voice and text communications to be augmented with pictures or videos. The digital cameras may be also be used to read bar codes or for other image data input applications, further enhancing the wireless communication devices' functionality.

The optical design of miniature digital camera lenses is quite different from the design of conventional camera lenses. A common challenge in designing a digital camera lens that is to be incorporated into a handheld wireless communication device is that a relatively small space is typically allocated to accommodate the camera lens. Another challenge is that the image sensors used in digital cameras that are to be integrated into handheld wireless communication devices typically are smaller, and particularly in the case of multi-megapixel sensors, have pixels that are closer in size to the theoretical resolution limit that is imposed by diffraction effects. As the theoretical resolution is approached, the design of the lenses becomes more difficult, especially for low f-number lenses, which are desirable for good performance under low lighting conditions.

Certain miniature digital camera lenses have been proposed that include molded plastic or glass aspheric lens elements. Given the wide range of temperature variations, from −15 C to 40 C, and humidity variations that handheld wireless communication devices are typically subjected to, there is a risk of environmentally induced degradation of plastic lens elements. Additionally, maintaining manufacturing tolerances for aspheric lens elements increases the costs associated with their use.

Up to now, the number of pixels in image sensors used in cameras in handheld wireless communication devices has typically been limited to 1.3 megapixels. In a well-designed digital camera, the camera lens should be capable of imaging a scene at a resolution that, at least, approaches the pitch of pixels in the image sensor. The desire to increase the resolution of the image sensors used in cameras in handheld wireless communication devices into the multi-megapixel range, coupled with the constraint on available space, increases the challenge of designing a lens that has sufficient resolution.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
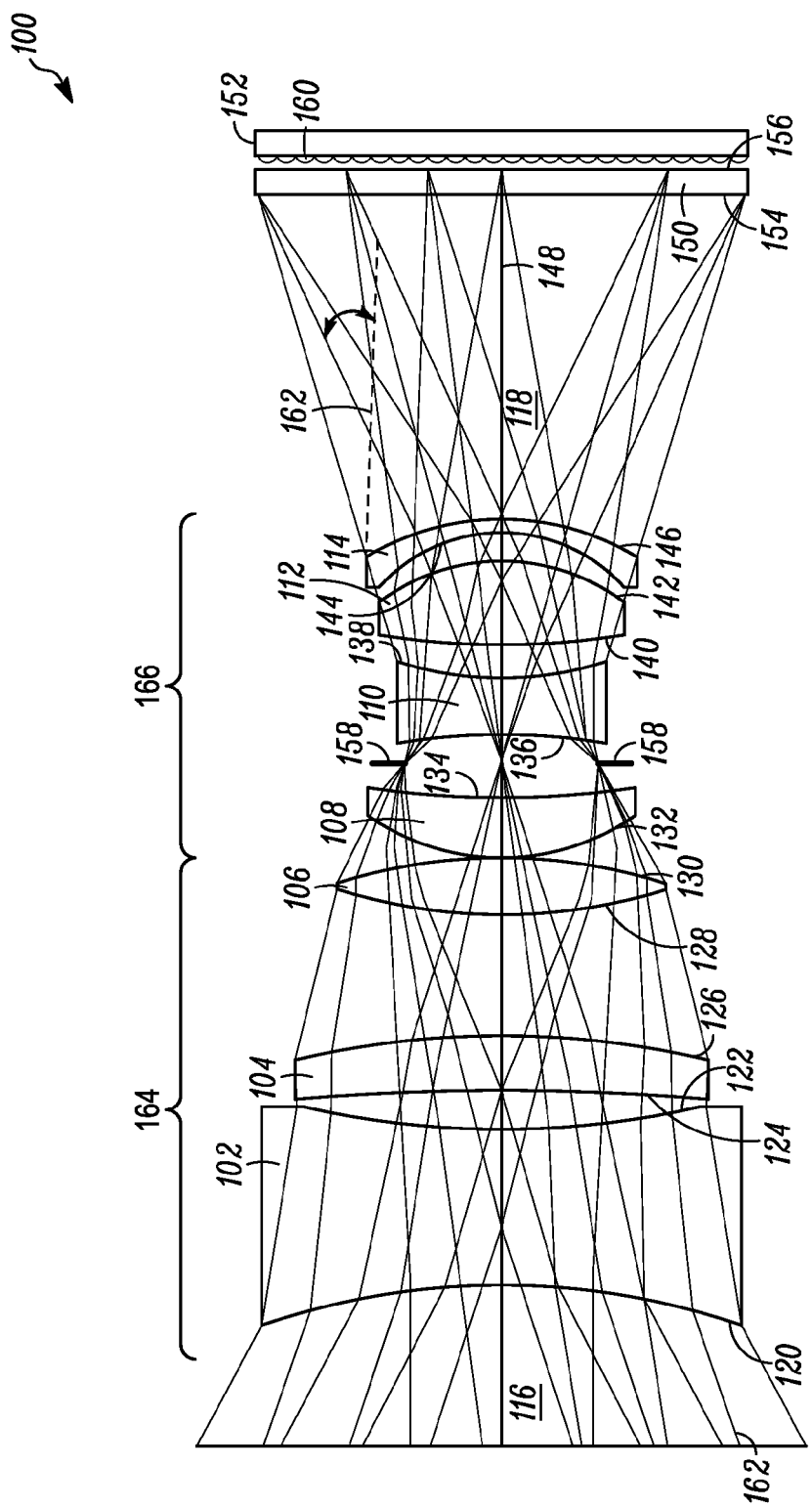
FIG. 1 is a schematic representation of a digital camera lens according to a first embodiment.

FIG. 1 is a schematic representation of a digital camera lens 100 according to a first embodiment. The digital camera lens 100 includes seven lenses 102, 104, 106, 108, 110, 112, 114. In order from the object side 116 (at the left of FIG. 1) to the image side 118 (at the right of FIG. 1), the digital camera lens 100 includes: a first double concave lens 102 having a first concave surface 120 facing the object side 116 and a second concave surface 122 facing the image side 118; a first convergent (positive) meniscus lens 104 having a third concave surface 124 facing the object side 116 and a first convex surface 126 facing the image side 118; a first double convex lens 106 having a second convex surface 128 facing the object side 116 and a third convex surface 130 facing the image side 118; a second convergent meniscus lens 108 having a fourth convex surface 132 facing the object side 116 and fourth concave surface 134 facing the image side 118; a second double concave lens 110 having a fifth concave surface 136 facing the object side 116 and a sixth concave surface 138 facing the image side 118; a second double convex lens 112 having a fifth convex surface 140 facing the object side 116 and a sixth convex surface facing 142 the image side 118; and a divergent (negative) meniscus lens 114 having a seventh concave surface 144 facing the object side 116 and an seventh convex surface 146 facing the image side 118.

Table I and table II below describe the lenses 102, 104, 106, 108, 110, 112, 114 and their relative positions. In table I the first column indicates the lens number starting from the object side 116, the second column indicates the surface number starting from the object side 116, the third column gives the radius R of each surface, and the fourth column gives the spacing t between adjacent surfaces along an optical axis 148 of the camera lens 100. The spacing t of the seventh convex surface 146 of the divergent meniscus lens 114 is given relative to a flat glass element 150 that protects an image sensor 152 used with the digital camera lens 100.

The sixteenth and seventeenth rows of table I indicate the locations and radius (infinite for flat surfaces) of a first surface 154 and a second surface 156 of the flat glass element 150. The ninth row of table I indicates the location of an aperture stop 158. In FIG. 1 light rays are shown entering the camera lens 100 at the object side 116 from an object that is located far off to the left beyond the drawing sheet. The camera lens 100 is able to focus objects as close as 10 cm. Typically, an auto-focusing mechanism, the details of which are outside the scope of the present description, will be used to perform auto-focusing.

TABLE I

| Lens # | Surface # | Radius R (mm) | t (mm) |
|---|---|---|---|
| 1 | 1 | −9.251532 | 1.99778653 |
| 1 | 2 | 12.34806 | 0.3942978 |
| 2 | 3 | −66.07439 | 0.75 |
| 2 | 4 | −11.84029 | 1.752293 |
| 3 | 5 | 41.21317 | 0.4948125 |
| 3 | 6 | −7.026944 | 0.0125 |
| 4 | 7 | 2.788804 | 0.8348438 |
| 4 | 8 | 33.34352 | 0.3137959 |
| stop |  | ∞ | 0.375866 |
| 5 | 9 | −6.643244 | 0.7215 |
| 5 | 10 | 3.750318 | 0.4875 |
| 6 | 11 | 27.2021 | 0.9737813 |
| 6 | 12 | −2.425162 | 0.3373188 |
| 7 | 13 | −1.997785 | 0.1597998 |
| 7 | 14 | −3.215151 | 4.154446 |
| cover | 15 | ∞ | 0.25 |
| cover | 16 | ∞ |  |

In table II the first column indicates lens number, the second column gives the index of refraction $n_d$ at 587.6 nanometers (green), the third column gives the index of refraction at 656.3 nanometers (red), the fourth column gives the index of refraction at 486.1 nanometers (blue), and the fifth column gives the Abbe number.

TABLE II

| Lens # | Index $n_d$ (@ 587.6 nm) | Index (@ 656.3 nm) | Index (@ 486.1 nm) | Abbe No. |
|---|---|---|---|---|
| 1 | 1.56882549 | 1.56574837 | 1.57591449 | 55.9758 |
| 2 | 1.52249219 | 1.51983293 | 1.52856863 | 59.835 |
| 3 | 1.51111929 | 1.50853993 | 1.51700473 | 60.4062 |
| 4 | 1.58312717 | 1.58014901 | 1.58996008 | 59.4596 |
| 5 | 1.66679593 | 1.66092268 | 1.68110346 | 33.0550 |
| 6 | 1.58312717 | 1.58014901 | 1.58996008 | 59.4596 |
| 7 | 1.75499705 | 1.75062636 | 1.76506181 | 52.3228 |

The camera lens design shown in FIG. 1 and described in table I and table II is designed for a 1/2.7" image sensor 152 that requires an image field radius of 3.35 mm. The total track length (from the first surface 120 to the image sensor 152) was 14.01 mm, the effective focal length was 6.25 mm and the back focal distance (measured from the seventh convex surface 146 to the image sensor 152) was 4.32 mm. The relatively long back focal distance makes the focusing somewhat less sensitive to the relative position of the digital camera lens 100 and the image sensor 152, thereby facilitating auto-focus. In focusing, the digital camera lens 100 is suitably moved relative to the image sensor 152 over a range of 0.25 mm. (It will be apparent to one skilled in the art that all of the dimensions of the camera lens 100 can be scaled up for larger image sensors, and scaled down, to an extent limited by diffraction, for small image sensors)

The aperture stop 158 is positioned between the second convergent meniscus lens 108 and the second double concave lens 110. With the digital camera lens 100 dimensions scaled to the dimensions shown in table I, the open radius of the aperture stop 158 was set at 1.177582 mm, yielding a low F-number of 2.8. A low F-number increases the amount of light transferred to the image sensor 152. It is particularly useful to have a low F-number in a camera lens that is to be integrated into handheld communication devices. A low F-number is desirable for imaging under low light conditions.

The image sensor 152 includes a microlens array 160 that directs light to light collection areas of each pixel (not shown) of the image sensor 152. The digital camera lens 100 has a chief ray 162 that is incident on the image sensor 152 at an angle of 25.6 degrees. Having a relatively low chief ray angle is important for use with image sensors that use microlens arrays. Typical microlens arrays reject greater percentages of incident light, particularly at the peripheral of the image sensor, as the angle of incidence increases beyond about 30 degrees. By having a low chief ray angle, rejection of light and the accompanying brightness fall off towards the periphery of the image sensor 152 is substantially reduced.

The fact that the digital camera lens 100 includes spherical surfaces 120–146 (as opposed to requiring one or more aspherical surfaces) allows for a greater range of manufacturing processes to be used in producing the digital camera lens 100. Flexibility in manufacturing choices is helpful for camera lenses which are to be incorporated into multifunctional handheld devices, because cost constraints limit the budget that can allocated for each particular subsystem of the devices including the digital camera lens 100.

The digital camera lens 100 has a field of view of about 56 degrees which is desirable for lenses for handheld wireless communication devices. Despite the relatively large field of view the digital camera lens 100 yields optical distortion less than 2.5%.

The seven lenses 102, 104, 106, 108, 110, 112, 114 of the camera lens 100 can be grouped in two lens groups 164, 166. A first group 164 which is a triplet and is located near the object side 116 includes the first double concave lens 102, the first convergent meniscus lens 104, and the first double convex lens 106. The second group 166 which is located near the image side 118 includes the second convergent meniscus lens 108, the second double concave lens 110, the second double convex lens 112 and the divergent meniscus 114. Suitably the focal length F1 of the first group 164, the focal length F2 of the second group 166, the focal length F of the camera lens 100, and the back focal distance BFD of the camera lens 100 satisfy the following inequality relations:

$$0.277 < F/F1 < 0.308$$

$$0.457 < F/F2 < 0.537$$

$$BFD/F > 0.6$$

Additionally it is desirable that the Abbe number for the second double concave lens 110 satisfy the following inequality relation:

$$Vd(\text{lens } 5) < 36,$$

and, that the Abbe number for the other lenses 102, 104, 106, 108, 112, 114 satisfy the following inequality relation:

$$Vd(\text{all other lenses}) > 52$$

The foregoing inequality relations also apply to other embodiments described below as well.

Figure 2:
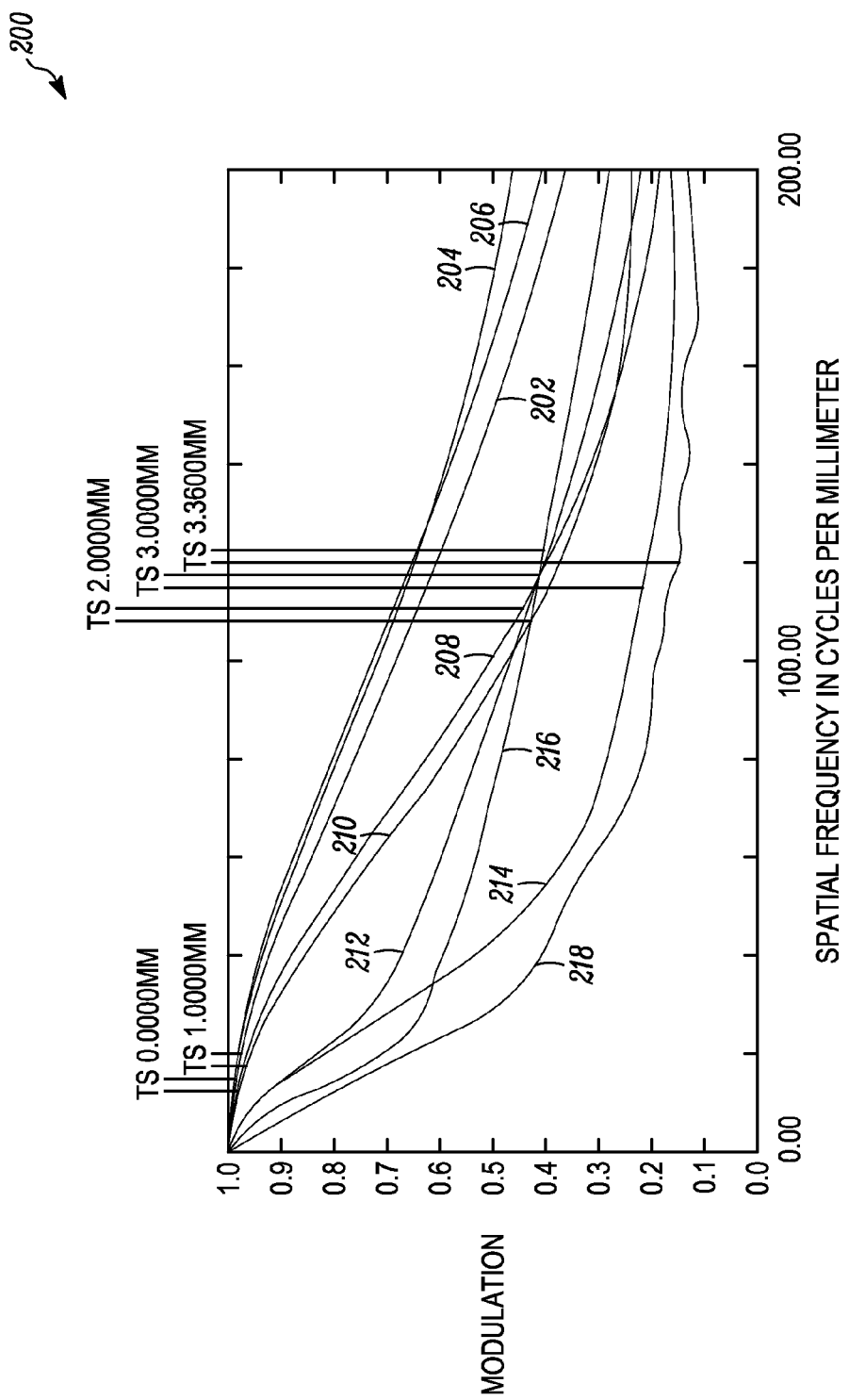
FIG. 2 is a graph including plots of Modulation Transfer Function at several points in an image plane of a lens of the type shown in FIG. 1.

FIG. 2 shows a graph 200 including plots 202, 204, 206, 208, 210, 212, 214, 216, 218, 220 of Modulation Transfer Function (MTF) at several points in an image plane of a lens of the type shown in FIG. 1. The plots 202–220 shown in FIG. 2 are based on an object located at infinity. The abscissa of the graph indicates line pairs per millimeter and the ordinate of the graph indicates the ratio of output modulation amplitude to input modulation amplitude. The graph shows MTF at an image focal plane (located at 4.318919 mm from the intersection of the final surface 146 of the digital camera lens 100 with the optical axis 148). A first plot 202 shows MTF at the image focal plane on the optical axis 148. A second plot 204 and a third plot 206 show the sagittal MTF and the tangential MTF respectively, at the focal plane, 1.0 mm from the optical axis 148 along the radial direction. A fourth plot 208 and a fifth plot 210 show the sagittal MTF and the tangential MTF respectively, at the focal plane, 2.0 mm from the optical axis 148. A sixth plot 212 and a seventh plot 214 show the sagittal MTF and the tangential MTF respectively, at the focal plane, 3.0 mm from the optical axis 148. An eighth plot 216 and a ninth plot 218 show the sagittal MTF and the tangential MTF respectively, at the focal plane, 3.35 mm from the optical axis 148. The MTF plots shown in FIG. 2 are based on geometric optics. The abscissa of the graph 200 ranges from zero up to 200 line pairs per millimeter which corresponds to a pixel size of 2.5 microns (a size suitable for a 3 megapixel image sensor having a diagonal equal to 6.7 mm). Note, that at a spatial frequency of 200 line pairs per millimeter, the digital camera lens 100 is able to maintain the MTF above 0.10. Thus, the digital camera lens 100 provides good performance considering its size, F-number, and field of view.

According to a second embodiment, a camera lens that has lenses described in table III below is provided. The arrangement of table III is the same as the arrangement of table I described above.

TABLE III

| Lens # | Surface # | Radius R (mm) | t (mm) |
| --- | --- | --- | --- |
| 1 | 1 | −21.82299 | 0.02499995 |
| 1 | 2 | 6.64874 | 0.9645285 |
| 2 | 3 | −121.536 | 1.910453 |
| 2 | 4 | −14.59909 | 1.892384 |
| 3 | 5 | 19.5694 | 3.0000533 |
| 3 | 6 | −8.970675 | 1.009468 |
| 4 | 7 | 2.810638 | 0.7662688 |
| 4 | 8 | 38.14589 | 0.1833677 |
| stop | | ∞ | 0.3169003 |
| 5 | 9 | −9.520424 | 0.6878352 |
| 5 | 10 | 3.143581 | 0.2380642 |
| 6 | 11 | 10.43485 | 1.863214 |
| 6 | 12 | −2.849094 | 0.4734582 |
| 7 | 13 | −2.256812 | 0.02462413 |
| 7 | 14 | −4.03729 | 4.427421 |
| cover | 15 | ∞ | 0.25 |
| cover | 16 | ∞ | |

The type of lenses used in each position is the same in the first and second embodiments; however the curvature and positioning of the surfaces of the lenses are different. The camera lens according to the second embodiment has similar attributes (e.g., focal length, f-number, field of view, resolving power). The indices of refraction and Abbe numbers of the second embodiment camera lens are the same as in the first embodiment camera lens 100 and are shown in table II.

The second embodiment lens has a total track length of 18.03 mm, an effective focal length was 6.25 mm, a back focal distance of 4.68 mm and an aperture stop radius of 1.32648, yielding a low F-number of 2.8. The chief ray angle of the second embodiment lens is 24.7 degrees. The second embodiment lens has a field of view of 56 degrees and yields an optical distortion less than 1%. The second embodiment lens also uses spherical lenses.

Figure 3:
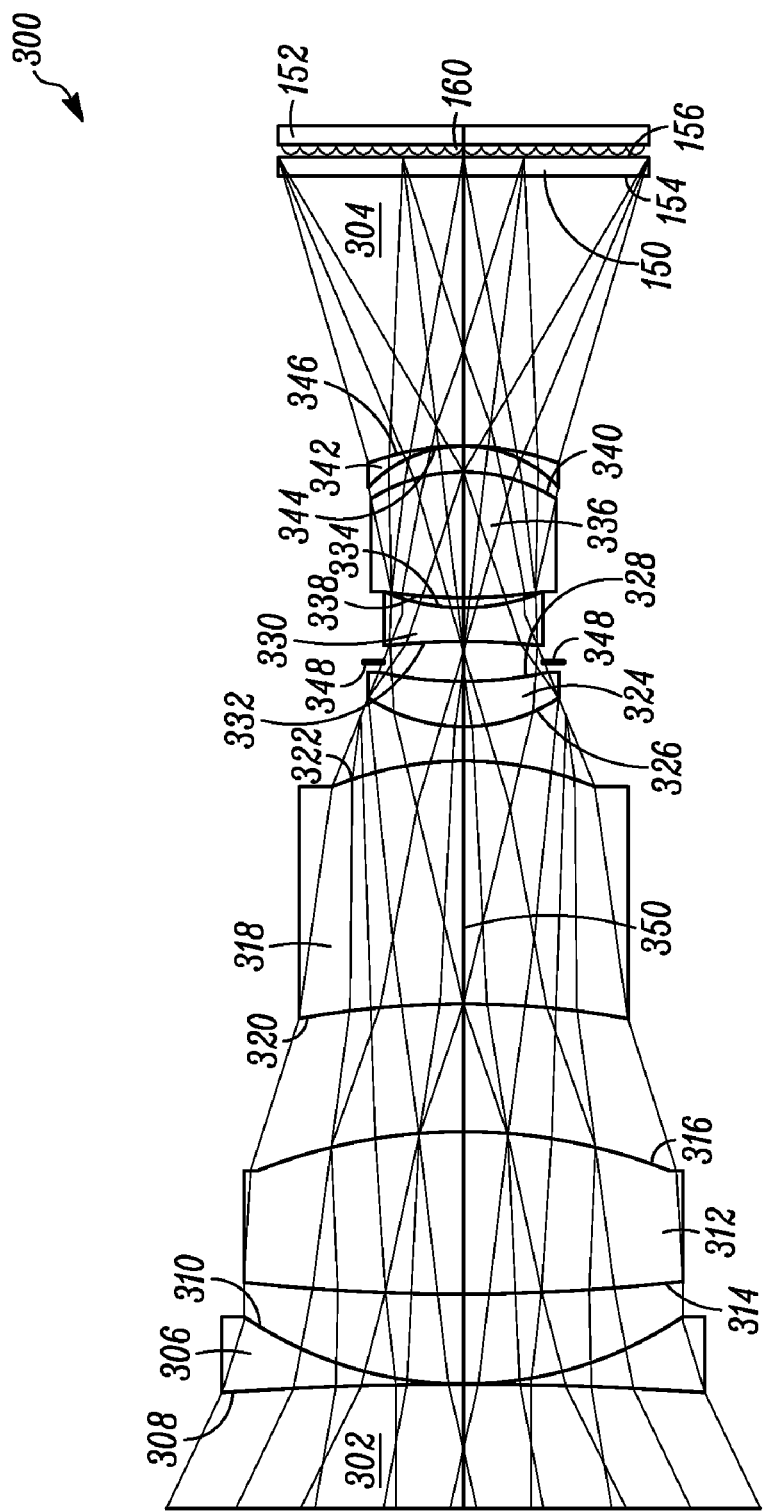
FIG. 3 is a schematic representation of a digital camera lens according to a third embodiment.

FIG. 3 shows a schematic representation of a digital camera lens 300 according to a third embodiment. The third embodiment digital camera lens 300 includes in order from an object side 302 to an image side 304: a first double concave lens 306 having a first concave surface 308 facing the object side 302 and a second concave surface 310 facing the image side 304; a first double convex lens 312 having a first convex surface 314 facing the object side 302 and a second convex surface 316 facing the image side 304; a first convergent meniscus lens 318 having a third concave surface 320 facing the object side 302 and a third convex surface 322 facing the image side 304; a second convergent meniscus lens 324 having a fourth convex surface 326 facing the object side 302 and fourth concave surface 328 facing the image side 304; a second double concave lens 330 having a fifth concave surface 332 facing the object side 302 and a sixth concave surface 334 facing the image side 304; a second double convex lens 336 having a fifth convex surface 338 facing the object side 302 and a sixth convex surface 340 facing the image side 304; and a divergent meniscus lens 342 having a seventh concave surface 344 facing the object side 302 and an seventh convex surface 346 facing the image side 304.

Table IV below and table II above describe the lenses 306, 312, 318, 324, 330, 336, 342 and their relative positions. The arrangement of table IV is the same as the arrangement of table I described above.

TABLE IV

| Lens # | Surface # | Radius R (mm) | t (mm) |
| --- | --- | --- | --- |
| 1 | 1 | −74.31595 | 0.02000003 |
| 1 | 2 | 6.334437 | 1.529239 |
| 2 | 3 | 34.24003 | 2.657562 |
| 2 | 4 | −10.26095 | 2.198213 |
| 3 | 5 | −15.79446 | 4.000111 |
| 3 | 6 | −7.088317 | 0.5534735 |
| 4 | 7 | 2.691467 | 0.8153868 |
| 4 | 8 | 11.85225 | 0.2786541 |
| stop | | ∞ | 0.3478188 |
| 5 | 9 | −10.15491 | 0.5895439 |
| 5 | 10 | 3.119858 | 0.1761461 |
| 6 | 11 | 8.264103 | 2.10665 |
| 6 | 12 | −2..90191 | 0.3941137 |
| 7 | 13 | −2.278478 | 0.01502463 |
| 7 | 14 | −3.832201 | 4.567591 |
| cover | 15 | ∞ | 0.25 |
| cover | 16 | ∞ | |

The third embodiment lens 300 has a total track length of 20.50 mm, an effective focal length was 6.25 mm, a back focal distance of 4.73 mm and an aperture stop 348 radius of 1.391686, yielding a low F-number of 2.8. The third embodiment lens 300 has a field of view of 56 degrees and yields an optical distortion less than 3%. The chief ray angle of the third embodiment was 25 degrees. The third embodiment lens 300 also uses all spherical lenses.

Figure 4:
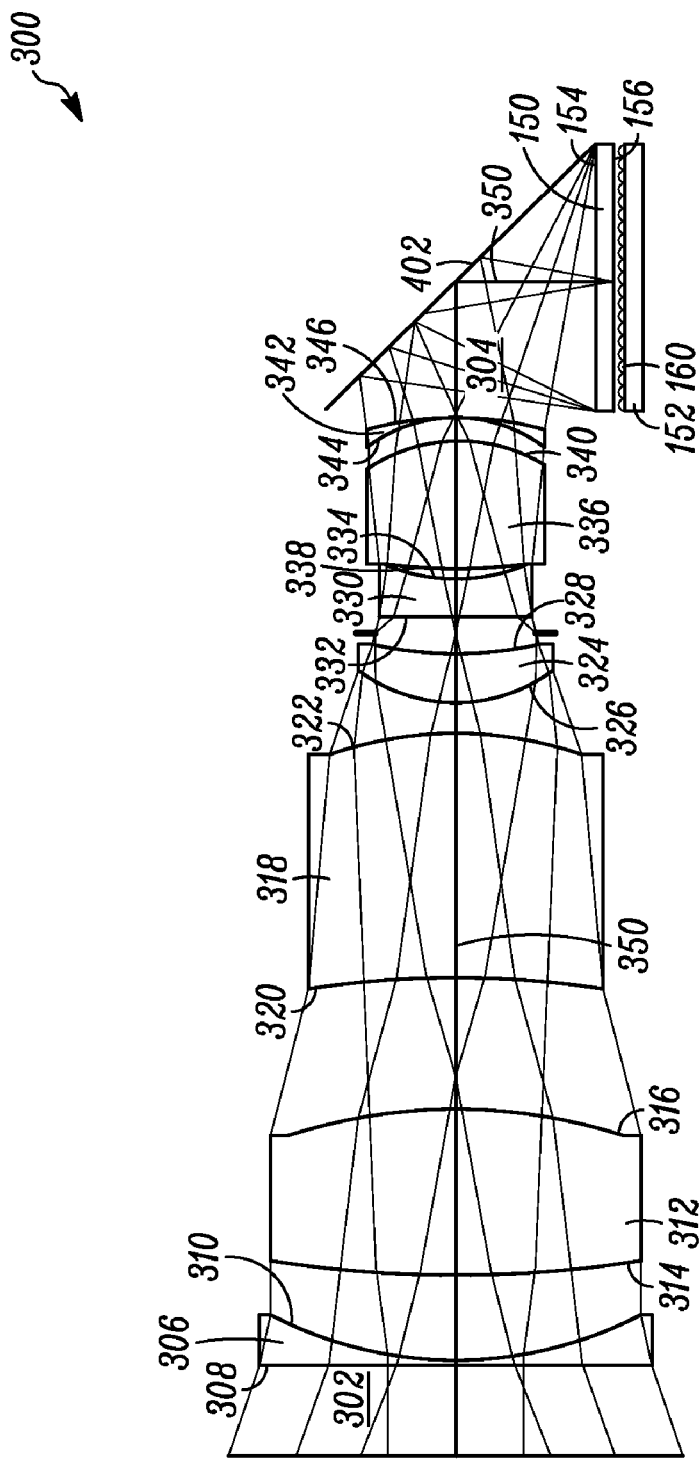
FIG. 4 is a schematic representation of the camera lens shown in FIG. 3 with the optical axis of the camera lens folded by a turning mirror.

FIG. 4 shows a schematic representation of the camera lens 300 with an optical axis 350 of the camera lens 300 folded by a folding mirror 402. The folding mirror 402 allows the orientation of the camera lens 300 relative to the image sensor 152 to be changed.

In order to increase light throughput and reduce stray light, one or more of the surfaces of the lenses 100, 300 are suitably coated with an antireflection optical coating. Moreover, an infrared blocking filter can be provided, suitably on the flat glass element 150, or last surface 146, 346 of the lenses 100, 300.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A fixed focal length digital camera lens comprising
   a first lens group facing an object side with all of the lenses therein having only spherical surfaces, wherein said first lens group has at least three lenses with a first composite focal length F1;
   a second lens group facing an image side with all of the lenses therein having only spherical surfaces, said second lens group being optically coupled to said first lens group, wherein said second lens group has at least three lenses with a second composite focal length F2, and
   wherein said first lens group and said second lens group alone provide a fixed third focal length F of the fixed focal length digital camera lens, wherein said first composite focal length F1, said second composite focal length F2, and said fixed third focal length F satisfy the following inequality relations:

$0.277 < F/F1 < 0.308$ $0.457 < F/F2 < 0.537$ and wherein the fixed focal length digital camera lens has a fixed third focal length F to back focal distance BFD ratio that satisfies the following inequality relation:

$BFD/F < 0.6$.

2. The fixed focal length digital camera lens according to claim 1 having a focal length of 6.25 mm, an F-number of 2.8 and a field of view of fifty-six degrees.

3. The fixed focal length digital camera lens according to claim 1 wherein said second lens group comprises, in order from said first lens group to said image side:
   a first convergent meniscus lens having a first convex surface facing said object side and a first concave surface facing said image side;
   a first double concave lens having a second concave surface facing said object side and a third concave surface facing said image side;
   a first double convex lens having a second convex surface facing said object side and a third convex surface facing said image side; and
   a divergent meniscus lens having a fourth concave surface facing said object side and a fourth convex surface facing said image side.

4. The fixed focal length digital camera lens according to claim 3 wherein said first lens group comprises, in order from said object side to said second lens group:
   a second double concave lens having a fifth concave surface facing said object side and a sixth concave surface facing said image side;
   a second convergent meniscus lens having a seventh concave surface facing said object side and a fifth convex surface facing said image side; and
   a second double convex lens having a sixth convex surface facing said object side and a seventh convex surface facing said image side.

5. The fixed focal length digital camera lens according to claim 3 wherein said first lens group comprises, in order from said object side to said second lens group:
   a second double concave lens having a fifth concave surface facing said object side and a sixth concave surface facing said image side;
   a second double convex lens having a fifth convex surface facing said object side and a sixth convex surface facing said image side; and
   a second convergent meniscus lens having a seventh concave surface facing said object side and a seventh convex surface facing said image side.

6. The fixed focal length digital camera lens according to claim 3 wherein said first double concave lens has an Abbe number less than 36.

7. A digital camera lens comprising an optical train comprising in order from an object side to an image side:
   a first double concave lens having a first concave surface facing said object side and a second concave surface facing said image side;
   a first convergent meniscus lens having a third concave surface facing said object side and a first convex surface facing said image side;
   a first double convex lens having a second convex surface facing said object side and a third convex surface facing said image side;
   a second convergent meniscus lens having a fourth convex surface facing said object side and a fourth concave surface facing said image side;
   a second double concave lens having a fifth concave surface facing said object side and a sixth concave surface facing said image side;
   a second double convex lens having a fifth convex surface facing said object side and a sixth convex surface facing said image side; and
   a divergent meniscus lens having a seventh concave surface facing said object side and a seventh convex surface facing said image side.

8. The digital camera lens according to claim 7 further comprising:
   an aperture stop disposed between said second convergent meniscus lens and said second double concave lens.

9. The digital camera lens according to claim 7 wherein:
   said first through seventh concave surfaces and said first through seventh convex surfaces are spherical.

10. The digital camera lens according to claim 7 wherein said lenses have indices of refraction, measured at 587.6 nanometers, that are substantially equal to values given in a first table below wherein said lenses are listed in sequence starting from said object side:

| Lens # | Index of refraction |
|---|---|
| 1 | 1.56882549 |
| 2 | 1.52249219 |
| 3 | 1.51111929 |
| 4 | 1.58312717 |
| 5 | 1.66679593 |
| 6 | 1.58312717 |
| 7 | 1.75499705 | and said surfaces of said lenses have radii and relative offsets of intersections with an optical axis that are substantially equal to values given in a second table below, wherein said radii and said relative offsets of said intersections of said surfaces are listed in sequence starting from said object side, and wherein said digital camera lens further comprises an aperture stop having a location substantially equal to a value given in the second table:

| Lens # | Surface # | Radius (mm) | t (mm) |
|---|---|---|---|
| 1 | 1 | −9.251532 | 1.99778653 |
| 1 | 2 | 12.34806 | 0.3942978 |
| 2 | 3 | −66.07439 | 0.75 |
| 2 | 4 | −11.84029 | 1.752293 |
| 3 | 5 | 41.21317 | 0.4948125 |
| 3 | 6 | −7.026944 | 0.0125 |
| 4 | 7 | 2.788804 | 0.8348438 |
| 4 | 8 | 33.34352 | 0.3137959 |
| stop | | ∞ | 0.375866 |
| 5 | 9 | −6.643244 | 0.7215 |
| 5 | 10 | 3.750318 | 0.4875 |
| 6 | 11 | 27.2021 | 0.9737813 |
| 6 | 12 | −2.425162 | 0.3373188 |
| 7 | 13 | −2.003408 | 0.1597998 |
| 7 | 14 | −3.407166 | 4.584513 |
| cover | 15 | ∞ | 0.25 |
| cover | 16 | ∞. | |

11. The digital camera lens according to claim 7 having a focal length of 6.25 mm, an F-number of 2.8 and a field of view of fifty-six degrees.

12. The digital camera lens according to claim 10 wherein said lenses have Abbe numbers that are substantially equal to values given by a third table wherein said lenses are listed in sequence starting at said object side:

| Lens # | Abbe # |
|---|---|
| 1 | 55.9758 |
| 2 | 59.835 |
| 3 | 60.4062 |
| 4 | 59.4596 |
| 5 | 33.0550 |
| 6 | 59.4596 |
| 7 | 52.3228. |

13. The digital camera lens according to claim 7 wherein said lenses have indices of refraction, measured at 587.6 nanometers, that are substantially equal to values given in a first table below wherein said lenses are listed in sequence starting from said object side:

| Lens # | Index of refraction |
|---|---|
| 1 | 1.56882549 |
| 2 | 1.52249219 |
| 3 | 1.51111929 |
| 4 | 1.58312717 |
| 5 | 1.66679593 |
| 6 | 1.58312717 |
| 7 | 1.75499705 | and said surfaces of said lenses have radii and relative offsets of intersections with an optical axis that are substantially equal to values given in a second table below, wherein said radii and said offsets of said intersections of said surfaces are listed in sequence starting from said object side, and wherein said camera lens further comprises an aperture stop having a location substantially equal to a value given in the second table:

| Lens # | Surface # | Radius R (mm) | t (mm) |
|---|---|---|---|
| 1 | 1 | −21.82299 | 0.02499995 |
| 1 | 2 | 6.64874 | 0.9645285 |
| 2 | 3 | −121.536 | 1.910453 |
| 2 | 4 | −14.59909 | 1.892384 |
| 3 | 5 | 19.5694 | 3.0000533 |
| 3 | 6 | −8.970675 | 1.009468 |
| 4 | 7 | 2.810638 | 0.7662688 |
| 4 | 8 | 38.14589 | 0.1833677 |
| stop | | ∞ | 0.3169003 |
| 5 | 9 | −9.520424 | 0.6878352 |
| 5 | 10 | 3.143581 | 0.2380642 |
| 6 | 11 | 10.43485 | 1.863214 |
| 6 | 12 | −2.849094 | 0.4734582 |
| 7 | 13 | −2.256812 | 0.02462413 |
| 7 | 14 | −4.03729 | 4.427421 |
| cover | 15 | ∞ | 0.25 |
| cover | 16 | ∞. | |

14. A digital camera lens comprising an optical train comprising in order from an object side to an image side:
 a first double concave lens having a first concave surface facing said object side and a second concave surface facing said image side;
 a first double convex lens having a first convex surface facing said object side and a second convex surface facing said image side;
 a first convergent meniscus lens having a third concave surface facing said object side and a third convex surface facing said image side;
 a second convergent meniscus lens having a fourth convex surface facing said object side and a fourth concave surface facing said image side;
 a second double concave lens having a fifth concave surface facing said object side and a sixth concave surface facing said image side;
 a second double convex lens having a fifth convex surface facing said object side and a sixth convex surface facing said image side; and
 a divergent meniscus lens having a seventh concave surface facing said object side and a seventh convex surface facing said image side.

15. The digital camera lens according to claim 14 further comprising:
 an aperture stop disposed between said second convergent meniscus lens and said second double concave lens.

16. The digital camera lens according to claim 14 wherein:
 said first through seventh concave surfaces and said first through seventh convex surfaces are spherical.

17. The digital camera lens according to claim 16 wherein said lenses have indices of refraction, measured at 587.6 nanometers, that are substantially equal to values given in a first table below wherein said lenses are listed in sequence starting from said object side:

| Lens # | Index of refraction |
|---|---|
| 1 | 1.56882549 |
| 2 | 1.52249219 |
| 3 | 1.51111929 |
| 4 | 1.58312717 |
| 5 | 1.66679593 |
| 6 | 1.58312717 |
| 7 | 1.75499705 | and said surfaces of said lenses have radii and relative offsets of intersections with an optical axis that are substantially equal to values given in a second table below, wherein said radii and said relative offsets of said intersections of said surfaces are listed in sequence starting from said object side, and wherein said digital camera lens further comprises an aperture stop having a location substantially equal to a value given in the second table:

| Lens # | Surface # | Radius R (mm) | t (mm) |
|---|---|---|---|
| 1 | 1 | −74.31595 | 0.02000003 |
| 1 | 2 | 6.334437 | 1.529239 |
| 2 | 3 | 34.24003 | 2.657562 |
| 2 | 4 | −10.26095 | 2.198213 |
| 3 | 5 | −15.79446 | 4.000111 |
| 3 | 6 | −7.088317 | 0.5534735 |
| 4 | 7 | 2.691467 | 0.8153868 |
| 4 | 8 | 11.85225 | 0.2786541 |
| stop | | ∞ | 0.3478188 |

-continued

| Lens # | Surface # | Radius R (mm) | t (mm) |
|---|---|---|---|
| 5 | 9 | −10.15491 | 0.5895439 |
| 5 | 10 | 3.119858 | 0.1761461 |
| 6 | 11 | 8.264103 | 2.10665 |
| 6 | 12 | −2..90191 | 0.3941137 |
| 7 | 13 | −2.278478 | 0.01502463 |
| 7 | 14 | −3.832201 | 4.567591 |
| 8 | 15 | ∞ | 0.25 |
| | 16 | ∞. | |

18. The digital camera lens according to claim 17 wherein said lenses have Abbe numbers substantially equal to values given by a third table wherein said lenses are listed in sequence starting at said object side:

| Lens # | Abbe # |
|---|---|
| 1 | 55.9758 |
| 2 | 59.835 |
| 3 | 60.4062 |
| 4 | 59.4596 |
| 5 | 33.0550 |
| 6 | 59.4596 |
| 7 | 52.3228. |

19. The digital camera lens according to claim 14 wherein said camera lens further comprises a turning mirror at said image side of said divergent meniscus lens.

* * * * *